United States Patent [19]
Kuei

[11] Patent Number: 4,789,146
[45] Date of Patent: Dec. 6, 1988

[54] ANGLE VISE

[76] Inventor: Andrew Kuei, No. 188-5, Kuang Ming Road, Taichung, Taiwan

[21] Appl. No.: 39,237

[22] Filed: Apr. 17, 1987

[51] Int. Cl.[4] .......... B23Q 1/04
[52] U.S. Cl. .......... 269/69; 269/63; 269/258
[58] Field of Search .......... 269/63, 69, 70, 73, 269/258; 16/DIG. 24, 114 R

[56] References Cited

U.S. PATENT DOCUMENTS

| | | | |
|---|---|---|---|
| 693,811 | 2/1902 | Yonge | 269/69 |
| 2,390,865 | 12/1945 | Bemis | 269/69 |
| 4,470,633 | 9/1984 | Fourrey et al. | 116/DIG. 24 |

OTHER PUBLICATIONS

Universay 3 Way Precision Vise, Universal Vise & Tool Company, Jun. 1943.

*Primary Examiner*—Frederick R. Schmidt
*Assistant Examiner*—Judy J. Hartman
*Attorney, Agent, or Firm*—Cushman, Darby & Cushman

[57] ABSTRACT

An angle vise includes a body with a curvilinear guide rail having a predetermined number of graduation holes on its outer surface, the holes being arranged in a manner such that a line connecting the centers of the graduation holes is a curve with a same center of curvature as the guide rail and located in equal intervals, a base with a curvilinear guide way having a predetermined number of selector holes located in equal intervals therealong in a manner that a line connecting the centers of these selector holes is coincident with the line connecting the centers of graduation holes. The interval between any two consecutive selector holes is smaller than the interval between any two consecutive graduation holes so that more setting of inclination may be achieved by aligning a graduation hole. Alignment is achieved through the holes with a selector hole by inserting a pin.

5 Claims, 6 Drawing Sheets

ANGLE VISE

BACKGROUND OF THE INVENTION

The present invention relates to an angle vise, particularly an angle vise which can have its inclination adjusted in equal inrement and secured firmly.

A prior art is shown in FIG. 1. It is usually composed of three main parts: a body (11), a base (12) and a locking mechanism (13). On the body (11) and the base (12) there are complementary curvilinear guide rails (14) and curvilinear guide ways (15) so that the body (11) can be rotated on the base (12) and the body (11) is secured by the locking mechanism (13). In order to ease selection of inclination for processing of different work pieces, scales (16 and 17) are put on the body (11) and the base (12) respectively. Though theoretically such a design permits stepless inclination adjustment, actually it is not practical since the using of an angle vise to hold working piece is to facilitate processing, and stepless adjustment is usually not necessary. Furthermore, working piece on angle vise has to be secured firmly to prevent from deviation during processing, but clamping force of the prior art is not strong enough, its locking mechanism is on side wall of the base (12), it is necessary to have its shape symmetrical to the guide way (15) and its locking force is exerted in only one direction. Moreover, in order to ease application of force to to prevent from interference with bench work, moveable handle is used to control turning of guide screw rod, the most popular design for which is using of a round bar (23) with plastic balls (24) at both and in a hole (22) at end of the guide screw rod (21). According to practice, the round bar (23) can't maintain its position in the hole (22), and looseness may affect exertion of force, cost of it is high too for it requires a sophisticated making process.

SUMMARY OF THE INVENTION

The main objective of the present invention is to provide an angle vise having a conventional scale as well as a novel means for increments adjustment in equal increment.

Another objective of the present invention is to provide an angle vise with a double and two-direction locking device to improve stability during the machining of a working piece thereon.

Another objective of the present invention is to provide an angle vise having a stable handle and screw guide rod to facilitate exertion of force.

Another objective of the present invention is to provide an angle vise with a simple locking mechanism and handle structure to lower production cost.

Therefore, the angle vise according to the present invention comprises at least:

a body having a rectangular platform defined thereon a fixed jaw element at one end of the platform and a support at another end of the platform, two parallel and symmetrical curvilinear guide rails each at a lower surface beneath one end of the platform, a predetermined number of graduation holes being defined in an outer surface of the curvilinear guide rail in a manner that a line connecting the centers of the graduation holes is a curve with a same center of curvature as the guide rails and the graduation holes are arranged in a first equal interval, a guide rod having an end connected to the fixed jaw element and another end to the support, a moveable jaw element slidably connected to the guide rod, and a guide screw rod having a first end threaded engaged with the support and a second end turnably connected to the moveable jaw element;

a base having a first side wall and a second side wall, two parallel and symmetrical curvilinear guide ways one being disposed at the top of each side wall, and curvilinear guide ways fitting in a complementary fashion to the curvilinear guide rails, a predetermined number of selector holes being defined in a second equal interval on the front curvilinear guide way in a manner that a line connecting the centers of the selector holes is coincident with the line connecting the centers of graduation holes, and the second interval between any two consecutive selector holes is smaller than the first interval between any two consecutive graduation holes; and a pin for inserting within a selector hole and a graduation hole simultaneously, so as to lock the body with respect to the base.

The present invention is further characterized by a sliding channel extending from inner side of the rear side wall of the base and a hole at the rear side wall, a screw rod turnably located in the hole, and a stopper with a flat surface and screwed to the screw rod so that by turning the guide screw rod the stopper can displace on the sliding channel for applying a force in two opposite directions against the rear curvilinear guide rail and the rear curvilinear guide way.

The present invention is further characterized by a holding hole of predetermined depth in axial direction of an end of the guide screw rod and a radial hole on a circumferential surface of the guide screw rod connecting to the axial holding hole. The holding hole is for installation of a spring and a gasket in order, and the radial hole is for insertion of a rod with tapered parts at both ends thereof in a manner that the relative position of the rod and guide screw rod is maintained by tension of the spring.

DETAILED DESCRIPTION OF THE PREFERRED EMBODIMENT

Figure 1:
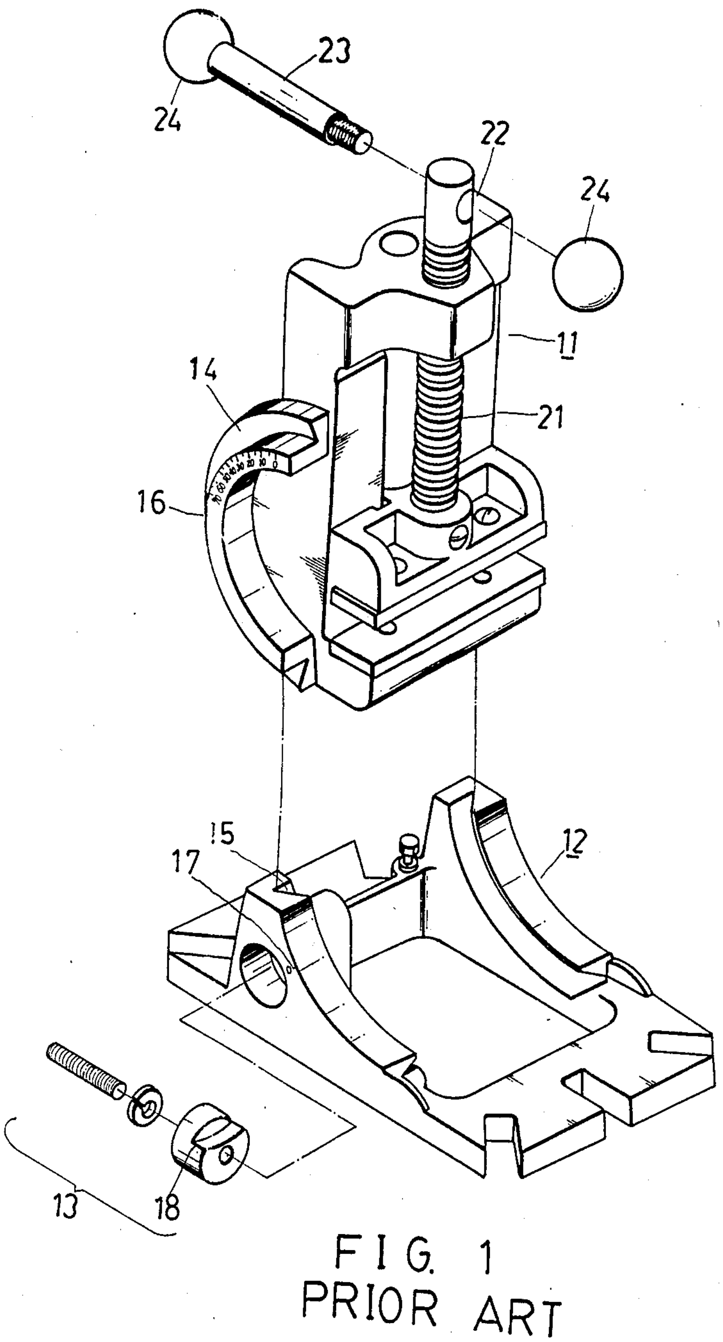
FIG. 1 PRIOR ART
FIG. 1 is a perspective and fragmental view of a prior art of angle vise.
Figure 2:
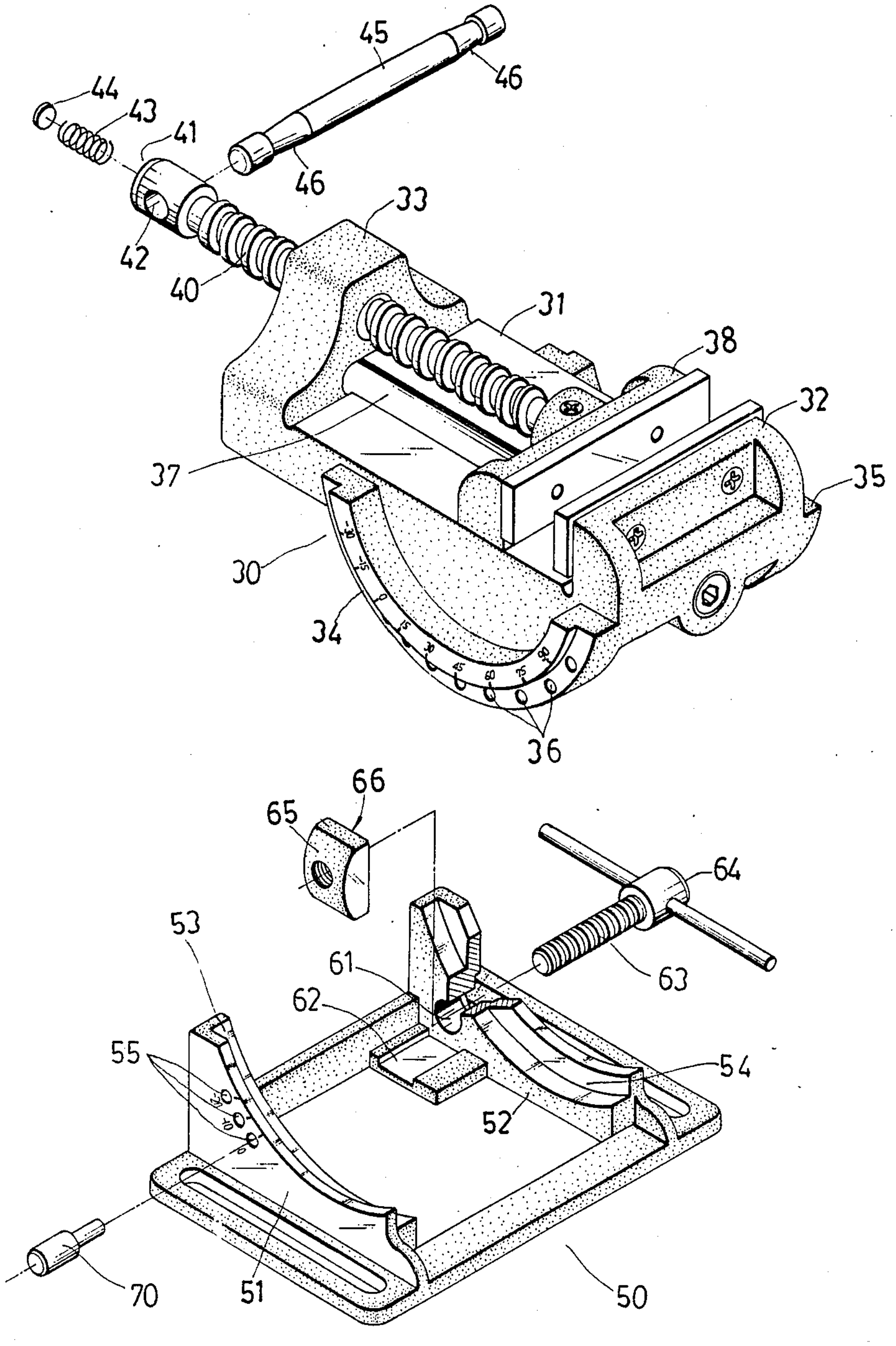
FIG. 2 is a perspective and fragmental view of a preferred embodiment according to the present invention.
Figure 3:
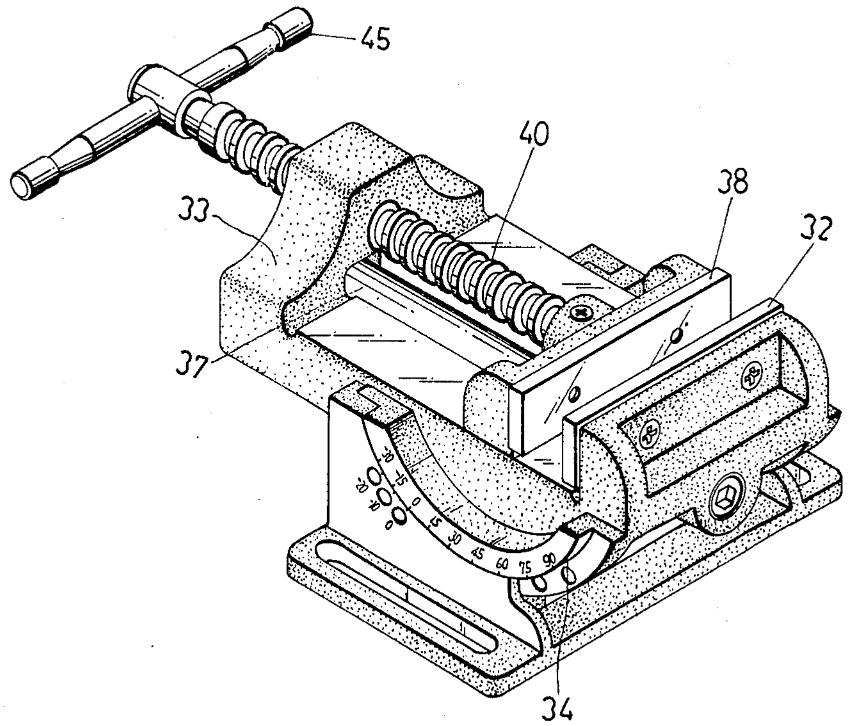
FIG. 3 is a perspective view of the preferred embodiment in FIG. 2.

Referring to the attached drawings, the present invention includes a body (30) with a rectangular platform (31) defined thereon having a fixed jaw element (32) at one end and a support (33) at the other end. There are two parallel and symmetrical curvilinear guide rails (34 and 35) on its laterial sides. The guide rail (34) has a plurality of graduation holes (36) at the other side. The line of centers for these graduation holes (36) is a curve with the same center of curvature as the guide rails, and every two consecutive graduation holes (36) are preferably 15 degrees apart. The present invention also has a guide rod (37) with an end fixed to the fixed jaw element (32) and another end to the support (33), a moveable jaw element (38) connected to the guide rod (37), a guide screw rod (40) threadedly screwed through the support (33) and having its front end turnably connected to the moveable jaw element (38), and a rear end with a hole (41) in axial direction with a predetermined depth and a radial hole (42) on the circumferential surface connecting to the hole (41), a spring 43 and a gasket (44) placed within the hole (41), a rod (45) with an outer diameter so that it can just pass the hole (42) and with tapered ends (46). By turning the guide screw rod (40), the moveable jaw element (38) is driven to move along the guide rod (37) for approaching or leaving the fixed jaw element (32) in order to hold or release the work piece.

The present invention further includes a base (50) with a side wall (51) at a front and another side wall (52) at a back end. On the top of each side wall (51 or 52) there is a curvilinear guide way (53 or 54). The guide ways (53 and 54) are parallel and symmetrical, and are complementary to the curvilinear guide rails (34) and 35) so that the body (30) can be turned on the base (50) for a predetermined degree. On the surface of the side wall (52) there is a hole (61) and a sliding channel (62) extending transversely from inner wall. A screw rod (63) with a head (64) which can be turnably connected to the hole (61) and a stopper (65) with a flat surface (66) slidably placed on the sliding channel (62) and screwed to the screw rod (63) are used so that turning of the screw rod (63) can displace the stopper (65) along the sliding channel (62) to make the flat surface (66) contact with or separate from inner surface of the guide rail (35). The guide way (53) has three selector holes (55) arranged in equal intervals. A line connecting the centers of these selector holes (55) is coincident with the line connecting the centers of the graduation holes (36). Every two consecutive selector holes (55) are 10 degrees apart, which is smaller than the 15 degrees, between every two consecutive graduation holes (36). A pin (70) which has an outer diameter for just passing through a selector hole (55) and a graduation hole (36) is used to maintain the body (30) on the base (50) at a certain inclination.

Figure 4:
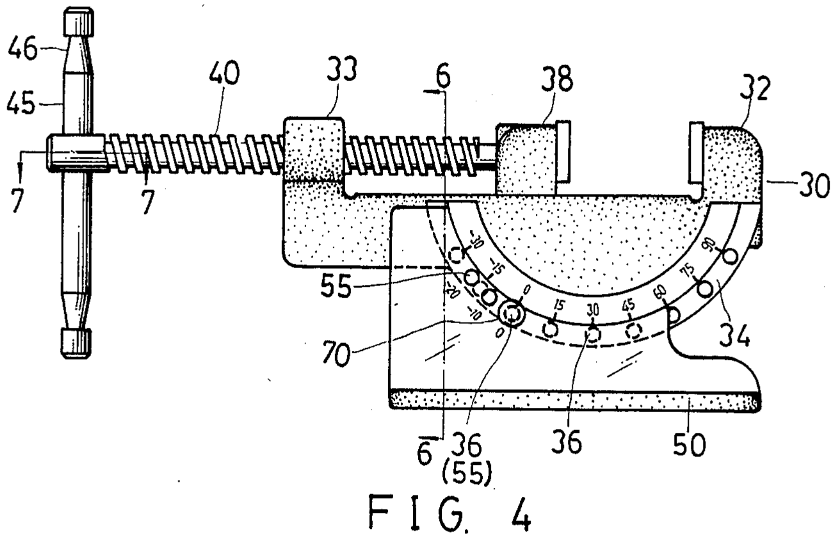
FIG. 4 is a front view of the preferred embodiment illustrated in FIG. 3 with the body in horizontal position.

Please referring to FIG. 4, when the body (40) is located on the base (50) horizontally, the graduation hole (36) for zero degrees is aligned with selector hole (55) for zero degrees. Holes on the left side of this alignment are marked with "minus" notation, and those on the right side are marked with "plus" notation. Then, by aligning any graduation hole (36) with any selector hole (55) by means of the pin (70), the inclination of the body (30) on the base (50) can be calculated with the following formula:

Degree of Graduation Hole−Degree of Selector Hole=Inclination

Figure 5A:
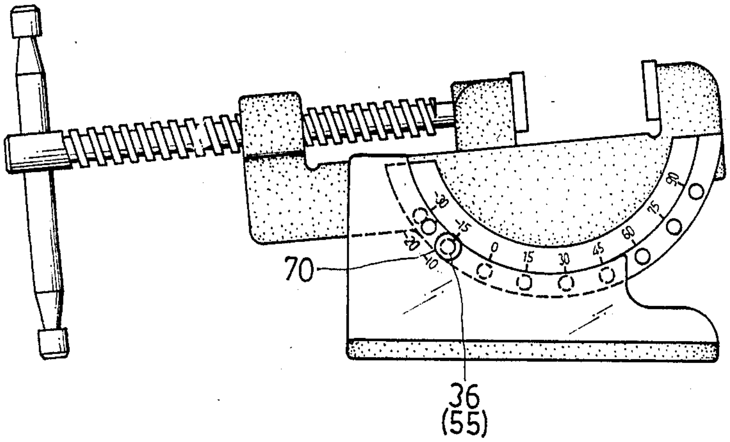
FIG. 5 (A), (B) and (C) illustrate the body at a different inclination.
Figure 5B:
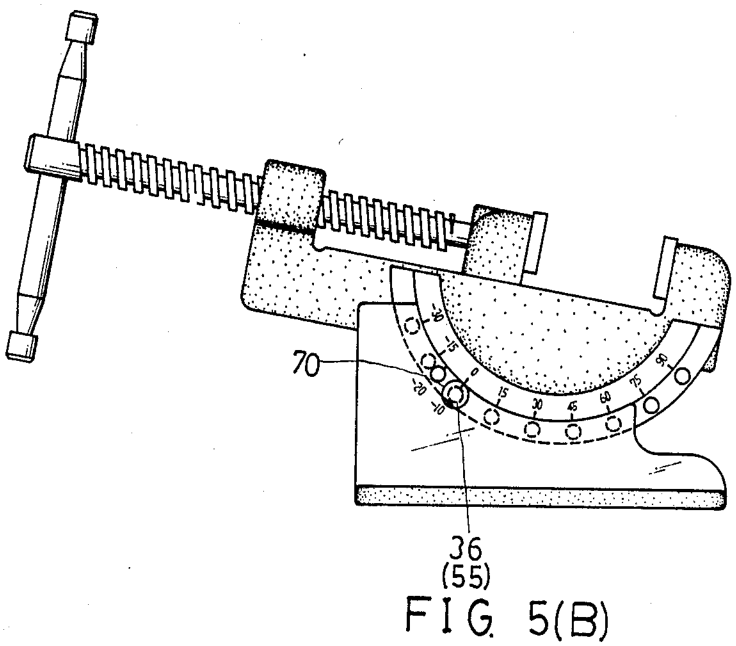
Figure 5C:
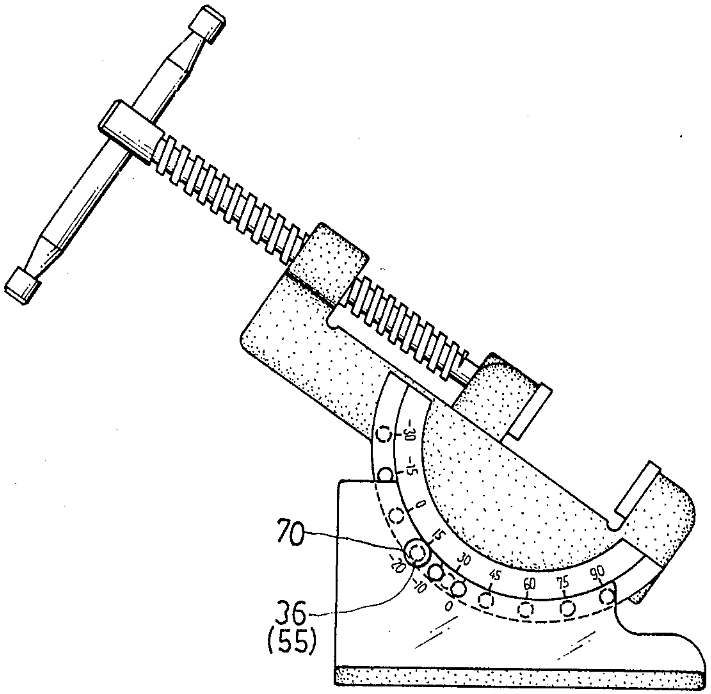
Figure 6:
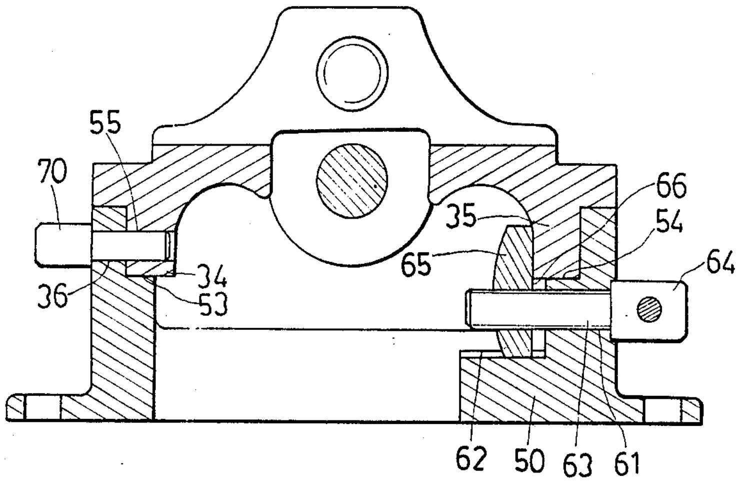
FIG. 6 is a partial cross sectional view along the line 6—6 in FIG. 3.

FIG. 5 includes examples of inclination calculation. As shown in FIG. 5 (A), when the graduation hole (36) aligned is $-15°$, and the selector hole (55) is $-10°$, the inclination is: $-15°-(-10°)=-5°$. As shown in FIG. 5 (B), when the graduation hole (36) aligned is 0° and the selector hole (55) is $-10°$, the inclination is $0°-(-10°)=10°$. As shown in FIG. 5 (C), when the graduation hole (36) aligned is 15° and the selector hole (55) is $-20°$, the inclination is $15°-(-20°)=35°$. Every two consecutive graduation holes (36) are 15° apart and every two consecutive selector holes (55) are 10° apart. Therefore, by matching between graduation hole (36) and selector (55) with the pin (70), inclination can be adjusted with 5° as an increment/decrement to satisfy normal requirement. For inclination at any special degree, contacting between the guide rail (35) and the stopper (65) can position the body (30) at the special degree, Referring to FIG. 6, when the screw rod (63) is turned to drive the stopper (65) to contact with the guide rail (35), the guide rail (35) and guide way (54) are subject to pressure applied by the stopper (65) and the head (64) of the screw rod (63) in two opposite directions. Therefore, the body (30) can be relatively tightly locked on the base (50). Moreover, after inserting the pin (70) into the graduation hole (36) and the selector hole (55), the guide rail (34) and the guide rail (53) are locked to increase capacity of the body (30) for bearing machining load.

Figure 7:
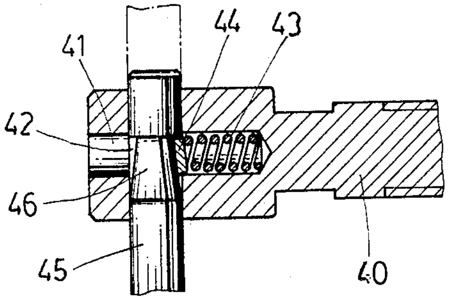
FIG. 7 is a partial cross sectional view along the line 7—7 in FIG. 3.

Referring to FIG. 7, after inserting a rod (45) into the hole (42) of the guide screw rod (40), the gasket (44) can compress the rod (45) under tension of the spring (43) so that circumference of the rod (45) keeps close contact with the inner wall of the hole (42) and, consequentially-the rod (45) and the guide screw rod (40) can maintain their relative position. Whenever the rod (45) is subjected to an axial pulling or pushing force, it moves along the hole (42) until the tapered part (46) to face the gasket (44). The gasket (44) is thus held in the tapered part (46) so that the rod (45) will not be separated from the hole (42).

What is claimed is:

1. An angle vise apparatus comprising:

a body having a rectangular platform portion, a fixed jaw element at one end of the platform portion and a support at another end of the platform portion, two parallel and symmetrical curvilinear guide rails each at a lower surface of the body beneath the platform portion, a predetermined number of graduation holes being defined in an outer surface of each of the curvilinear guide rails in a manner that a line connecting the centers of the graduation holes is a curve with a same center of curvature as the guide rails and the graduation holes are arranged in a first equal interval, a guide groove having an end connected to the fixed jaw element and another end to the support, a moveable jaw element slidably connected to the guide groove, and a guide screw rod having a first end threadedly engaged with the support and a second end turnably connected to the moveable jaw element;

a base having a first side wall and a second side wall, two parallel and symmetrical curvilinear guide ways, one being disposed at a top of each side wall, said curvilinear guide ways fitting in a complementary fashion to he curvilinear guide rails, a predetermined number of selector holes being defined in a second equal interval on the front curvilinear guide way in a manner that a line connecting the centers of the selector holes is coincident with the line connecting the centers of graduation holes, and the second interval between any two consecutive selector holes is smaller than the first interval between any two consecutive graduation holes; frictional lock means on the base to hinder relative motion between the base and the body; and a pin means for inserting within a selector hole and a graduation hole simultaneously, to lock said body with respect to said base.

2. An angle vise as claimed in claim 1 wherein the first interval between every two consecutive graduation holes is 15° as measured at the center of curvature, and the second interval between every two consecutive selector holes is 10° apart as measured at the center of curvature.

3. An angle vise as claimed in claim 1 or 2 wherein there is a hole defined in the first side wall of the base, a slide channel extending from inner side of the first side wall, a screw rod turnable within the hole, and a stopper with a flat surface placed on the sliding channel and screwed to the screw rod whereby the base may be frictionally engaged with the body so as to hinder relative motion there between.

4. An angle vise as claimed in claim 1 or 2, wherein there is a holding hole of predetermined depth in an axial direction at an end of the guide screw rod, and a radial hole defined on the circumference of the guide screw rod, a spring and a gasket being disposed in the holding hole, placed in order, and a rod passing through the radial hole, which rod has a tapered part at each end thereof.

5. An angle vise as claimed in claim 3, wherein there is a holding hole of predetermined depth in an axial direction at an end of the guide screw rod, and a radial hole defined on the circumference of the guide screw rod, a spring and a gasket being disposed in the holding hole, placed in order, and a rod passing through the radial hole, which rod has a tapered part at each end thereof.

* * * * *